(12) United States Patent
Chung et al.

(10) Patent No.: US 11,525,626 B2
(45) Date of Patent: Dec. 13, 2022

(54) FIRST-IN FIRST-OUT SOLDER CONTAINER AUTOMATIC SUPPLYING MANAGEMENT SYSTEM

(71) Applicant: BOSUNG ENG CO., LTD., Gyeonggi-do (KR)

(72) Inventors: Chan Sung Chung, Gyeonggi-do (KR); Ho Yeol Park, Gyeongsangbuk-do (KR)

(73) Assignee: BOSUNG ENG CO., LTD., Gyeonggi-Do (KR)

( * ) Notice: Subject to any disclaimer, the term of this patent is extended or adjusted under 35 U.S.C. 154(b) by 828 days.

(21) Appl. No.: 16/390,211

(22) Filed: Apr. 22, 2019

(65) Prior Publication Data

US 2020/0333067 A1  Oct. 22, 2020

(30) Foreign Application Priority Data

Apr. 16, 2019 (KR) .................. 10-2019-0044332

(51) Int. Cl.
| | |
|---|---|
| *B23K 37/00* | (2006.01) |
| *F25D 25/04* | (2006.01) |
| *B65G 49/00* | (2006.01) |
| *B65G 47/34* | (2006.01) |

(52) U.S. Cl.
CPC .............. *F25D 25/04* (2013.01); *B23K 37/00* (2013.01); *B65G 47/34* (2013.01); *B65G 49/00* (2013.01)

(58) Field of Classification Search
CPC ........ B23K 37/00; B23K 3/082; B65G 47/34; B65G 49/00
See application file for complete search history.

(56) References Cited

U.S. PATENT DOCUMENTS

| | | | | |
|---|---|---|---|---|
| 5,584,971 | A * | 12/1996 | Komino ................ | C23C 14/564 118/724 |
| 6,294,759 | B1 * | 9/2001 | Dunn, Jr. ................ | B23K 3/00 219/242 |
| 2014/0090826 | A1 * | 4/2014 | Yamada ................... | F28F 9/00 165/172 |

FOREIGN PATENT DOCUMENTS

KR        10-1186380 B1      9/2012

* cited by examiner

*Primary Examiner* — Erin B Saad
(74) *Attorney, Agent, or Firm* — The PL Law Group, PLLC

(57) ABSTRACT

A first-in first-out solder container automatic supply management system includes a refrigerating chamber configured to store a plurality of solder containers, a transfer part positioned outside the refrigerating chamber and configured to move at least one of the plurality of solder containers, a stirring part formed at one end of the transfer part and configured to stir the at least one solder container, and a hand part configured to move any one solder container of the at least one solder container positioned on the transfer part to the stirring part.

8 Claims, 7 Drawing Sheets

FIRST-IN FIRST-OUT SOLDER CONTAINER AUTOMATIC SUPPLYING MANAGEMENT SYSTEM

CROSS-REFERENCE TO RELATED APPLICATION

This application claims priority to and the benefit of Korean Patent Application No. 10-2019-0044332, filed on Apr. 16, 2019, the disclosure of which is incorporated herein by reference in its entirety.

BACKGROUND

1. Field of the Invention

Embodiments of the present invention relate to a first-in first-out solder container automatic supply management system.

2. Discussion of Related Art

Generally, solder pastes in a molten state are applied in a certain pattern to printed circuit boards used in electronic devices such as automobile electric parts, computers, mobile phones, and home appliances such that various types of small electronic parts, such as semiconductor chips and the like, can be mounted. Such solder pastes are in a state of being stored in a solder container to be distributed and stored and need to be refrigerated in order to prevent oxidation of the solder pastes inside the solder container.

Meanwhile, in the case in which a user desires to use a solder paste, when the solder paste taken out of a refrigerating chamber is used immediately, a condensation phenomenon or the like occurs so that it is required to leave the solder paste at room temperature for a certain time. In addition, precipitation of solder powder may occur in the leftover solder paste so that it is required to use the solder paste after being stirred for a predetermined time.

However, conventionally, the above-described operations such as the refrigeration storage in a refrigerating chamber, the storage at room temperature for a certain time before use, and stirring are all manually performed in individual equipment, and the first-in first-out management for refrigeration storage and the storage at room temperature is not properly performed. Accordingly, there is a problem in that it is difficult for an operator to confirm an accurate time for storing a plurality of solder pastes at room temperature when the plurality of solder pastes are used, and there are many problems such as not being allowed to store the plurality of solder pastes at room temperature for a sufficient time due to the operator's confusion or generation of defective products due to no stirring.

SUMMARY

Embodiments of the present invention are directed to providing a first-in first-out solder container automatic supply management system capable of preventing oxidation of contents of solder containers by storing a large number of solder containers in a refrigerating chamber.

Other embodiments of the present invention are directed to providing a first-in first-out solder container automatic supply management system capable of storing solder containers discharged from a refrigerating chamber at room temperature for a preset time and then automatically stirring the solder containers.

Other embodiments of the present invention are directed to providing a first-in first-out solder container automatic supply management system capable of selecting and supplying only a solder container of a specific manufacturer or type according to a user's need by classifying a plurality of solder containers by each manufacturer or type and storing the plurality of solder containers in a refrigerated state and at room temperature.

Other embodiments of the present invention are directed to providing a first-in first-out solder container automatic supply management system capable of increasing safety and convenience of an operator, in which discharging solder containers from a refrigerating chamber, storing solder containers at room temperature, and inputting solder containers to a stirrer are automated in a first-in first-out manner and which communicates with a manufacturing execution system (MES).

According to an aspect of the present invention, there is provided a first-in first-out solder container automatic supply management system including a refrigerating chamber configured to store a plurality of solder containers; a transfer part positioned outside the refrigerating chamber and configured to move at least one of the plurality of solder containers; a stirring part formed at one end of the transfer part and configured to stir the at least one solder container; and a hand part configured to move any one solder container of the at least one solder container positioned on the transfer part to the stirring part.

The refrigerating chamber may include a refrigerating housing and a plurality of storage wall parts positioned in the refrigerating housing and each configured to store the plurality of solder containers, and the plurality of solder containers may be stored and arranged on each of the plurality of storage wall parts in a line to be inclined to a ground.

Each of the plurality of storage wall parts may include a solder discharge part configured to discharge an outermost solder container among the plurality of stored solder containers to the transfer part, and the solder discharge part may stand up on the transfer part and discharge the outermost solder container.

The transfer part may include a plurality of first conveyor parts arranged at the same arrangement interval as that of the plurality of storage wall parts and configured to transfer the solder container discharged from the refrigerating chamber, and a second conveyor part arranged in a direction perpendicular to a transferring direction of the first conveyor part and configured to transfer the solder container to the stirring part.

The transfer part may further include a plurality of gripping parts for transporting the solder container positioned on the plurality of first conveyor parts to the second conveyor part side, wherein each of the plurality of gripping parts may transport the solder containers, which are discharged from the refrigerating chamber, on the plurality of first conveyor parts after a preset time has elapsed, and any one of the plurality of gripping parts may transport only the solder container which is positioned on the first conveyor part at a predetermined position among the plurality of first conveyor parts to the second conveyor part.

The number of the plurality of first conveyor parts may be the same as the number of the plurality of storage wall parts and the plurality of first conveyor parts may be arranged below the plurality of storage wall parts in a lateral direction thereof.

The hand part may include a gripper configured to grip any one of the solder containers on the transfer part, and a hand driving part configured to move the gripper to one side in a lateral direction thereof, wherein the gripper may be movable upward and downward in a direction perpendicular to a ground.

The stirring part may include a support frame, a stirring plate connected to the support frame through a plurality of elastic support parts, and a mounting part which is positioned on the stirring plate and on which the solder container is mounted.

The mounting part may be formed in a hollow cylinder shape and a longitudinal central axis thereof may be positioned to be inclined with respect to a ground.

The support frame may be positioned to surround an outer side surface of the stirring plate in a lateral direction thereof, the support frame may be connected to a side portion of the stirring plate in the lateral direction through the plurality of elastic support parts, and the stirring plate may be rotatable about a rotation central axis.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION

Hereinafter, exemplary embodiments of the present invention will be described in detail with reference to the accompanying drawings. However, these embodiments are only examples, and the present invention is not limited thereto.

When it is determined that detailed descriptions of related well-known technologies unnecessarily obscure the gist of the present invention during the description of the present invention, the detailed descriptions will be omitted. Some terms described below are defined in consideration of functions in the present invention, and meanings thereof may vary depending on, for example, a user or operator's intentions or customs. Therefore, the meanings of the terms should be interpreted on the basis of the scope of the present invention throughout this specification.

The technical concept of the present invention is defined by the appended claims. The following embodiments are only made to efficiently describe the technological scope of the present invention to those skilled in the art.

Figure 1:
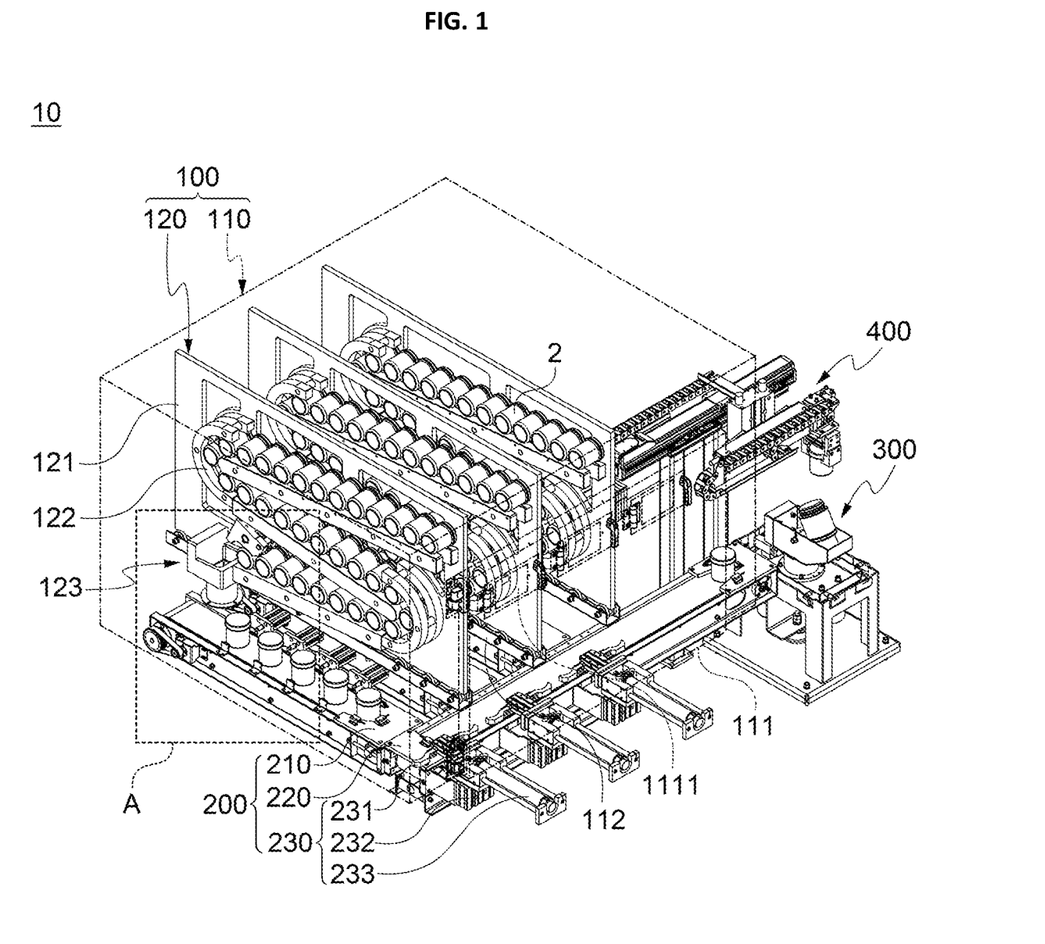
FIG. 1 is a view showing a first-in first-out solder container automatic supply management system according to an embodiment of the present invention.

FIG. 1 is a view showing a first-in first-out solder container automatic supply management system 10 according to an embodiment of the present invention.

Referring to FIG. 1, the first-in first-out solder container automatic supply management system 10 according to the embodiment of the present invention may include a refrigerating chamber 100 configured to store a plurality of solder containers 2, a transfer part 200 positioned outside the refrigerating chamber 100 and configured to move at least one of the plurality of solder containers 2, a stirring part 300 formed at one end of the transfer part 200 and configured to stir the at least one solder container 2, and a hand part 400 for moving any one solder container 2 of the at least one solder container 2 on the transfer part 200 to the stirring part 300.

That is, the plurality of solder containers 2 may be stored in the refrigerating chamber 100 in a refrigerated state, the solder container 2 discharged from the refrigerating chamber 100 may be transferred through the transfer part 200, and the solder container 2, which is moved to the stirring part 300 by the hand part 400, may be stirred by the stirring part 300.

Meanwhile, the refrigerating chamber 100 may include a refrigerating housing 110 of which an internal temperature may be adjusted and a plurality of storage wall parts 120 positioned in the refrigerating housing 110 and each configured to store the plurality of solder containers 2. In this case, the plurality of solder containers 2 may be stored and arranged on each of the plurality of storage wall parts 120 in a line to be inclined to the ground.

Further, different types of solder containers 2 may be stored in each of the plurality of storage wall parts 120. That is, a user may separate and store the solder containers 2 different from each other into the plurality of storage wall parts 120 according to each of the manufacturers or the detailed applications, and the plurality of solder containers 2 manufactured by the same manufacturer or having the same detailed use may be stored in each of the plurality of storage wall parts 120.

Meanwhile, the transfer part 200 may include a plurality of first conveyor parts 210 arranged at the same arrangement interval as that of the plurality of storage wall parts 120 and configured to transfer the solder container 2 discharged to the refrigerating chamber 100 and a second conveyor part 220 arranged in a direction perpendicular to a transferring direction of the first conveyor parts 210 and configured to transfer the solder container 2 to the stirring part 300.

Specifically, when three storage wall parts 120 are arranged at a predetermined interval, three first conveyor parts 210 may be arranged at the same interval as that of the plurality of storage wall parts 120. Further, at least one of the plurality of solder containers 2 in the refrigerating housing 110 may be discharged to one end of the first conveyor part 210. In this case, the at least one solder container 2 discharged from the first conveyor part 210 may be transferred to the other end of the first conveyor part 210 by the operation of the first conveyor part 210.

Further, the second conveyor part 220 may be positioned in the direction perpendicular to the transferring direction of the first conveyor part 210 at another side of the plurality of first conveyor parts 210. Meanwhile, the transfer part 200 may further include a plurality of gripping parts 230 for transporting the solder containers 2 positioned on the plurality of first conveyor parts 210 to the second conveyor part 220. Further, each of the plurality of gripping parts 230 may transport the solder containers 2, which are discharged from the refrigerating chamber 100, to the second conveyor part 220 on the plurality of first conveyor parts 210 after a preset time has elapsed.

In this case, the plurality of gripping parts 230 may be arranged at an outer side of the second conveyor part 220 to be spaced apart from each other by the same arrangement interval as that of the first conveyor part 210. Further, each of the plurality of gripping parts 230 may transport the solder container 2 positioned on each of the plurality of first conveyor parts 210 to the second conveyor part 220. Specifically, each of the plurality of gripping parts 230 may include a gripping member 231 configured to grip the solder container 2, a gripping motor 232 for determining whether to grip the gripping member 231, and a forward-rearward cylinder 233 configured to move the gripping member to the first conveyor part 210 forward and rearward.

Meanwhile, the solder container 2 discharged from the refrigerating chamber 100 to the first conveyor part 210 may be stored on the first conveyor part 210 at room temperature for a preset time. Accordingly, it is possible to prevent a condensation phenomenon from occurring in the contents (solder paste) of the solder containers 2 due to a rapid temperature difference. In this case, the solder containers 2 positioned on the first conveyor part 210 may be transported to the second conveyor part 220 after about two hours have elapsed and may be stirred.

Further, any one of the plurality of gripping parts 230 may transport only the solder container 2 which is positioned on the first conveyor part 210 at a predetermined position among the plurality of first conveyor parts 210 to the second conveyor part 220. For example, three types of solder containers 2 manufactured by different manufacturers may be separately stored in three storage wall parts 120 and three types of solder containers 2 may be discharged to three first conveyor parts 210.

In this case, only at least one gripping part 230 of the three gripping parts 230 may operate according to the user's need and transport only the solder container 2 manufactured by at least one manufacturer to the second conveyor part 220. That is, only a specific type of solder container 2 may be easily selected and used according to the user's need. As a result, only the solder container 2 to be used may be transported to the second conveyor part 220 and stirred by the stirring part 300 so that management of various types of solder containers 2 stored in a large number may be facilitated.

Further, the solder container 2 which is transported from the first conveyor part 210 to the second conveyor part 220 may be transferred to an end of the second conveyor part 220 in the transferring direction by the operation of the second conveyor part 220. In this case, the solder container 2 which is positioned on one end of the second conveyor part 220 may be moved to the stirring part 300 by the hand part 400. Thereafter, the contents of the solder container 2 positioned on the stirring part 300 may be used after being stirred for a preset time as the stirring part 300 operates.

Meanwhile, in the present drawing, it is shown that the second conveyor part 220 transports the solder container 2 in a right upward direction and the stirring part 300 is positioned at a right end of the second conveyor part 220, but the present invention is only exemplary and is not limited thereto. The second conveyor part 220 may transport the solder container 2 in a left downward direction and the stirring part 300 may also be positioned at a left end of the second conveyor part 220.

Figure 2:
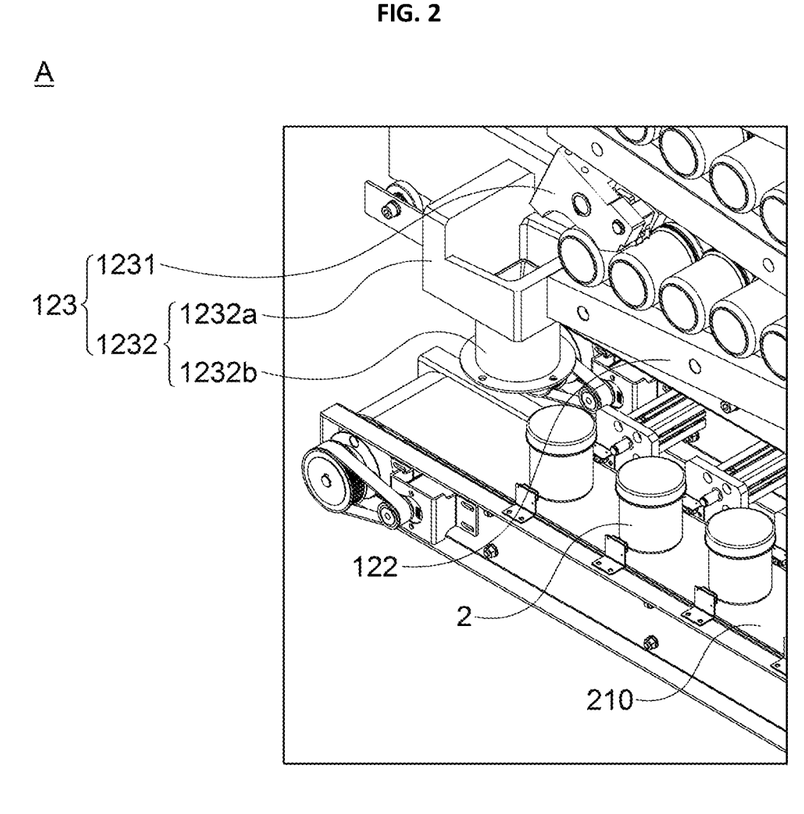
FIG. 2 is an enlarged view of a part A of FIG. 1.
Figure 3:
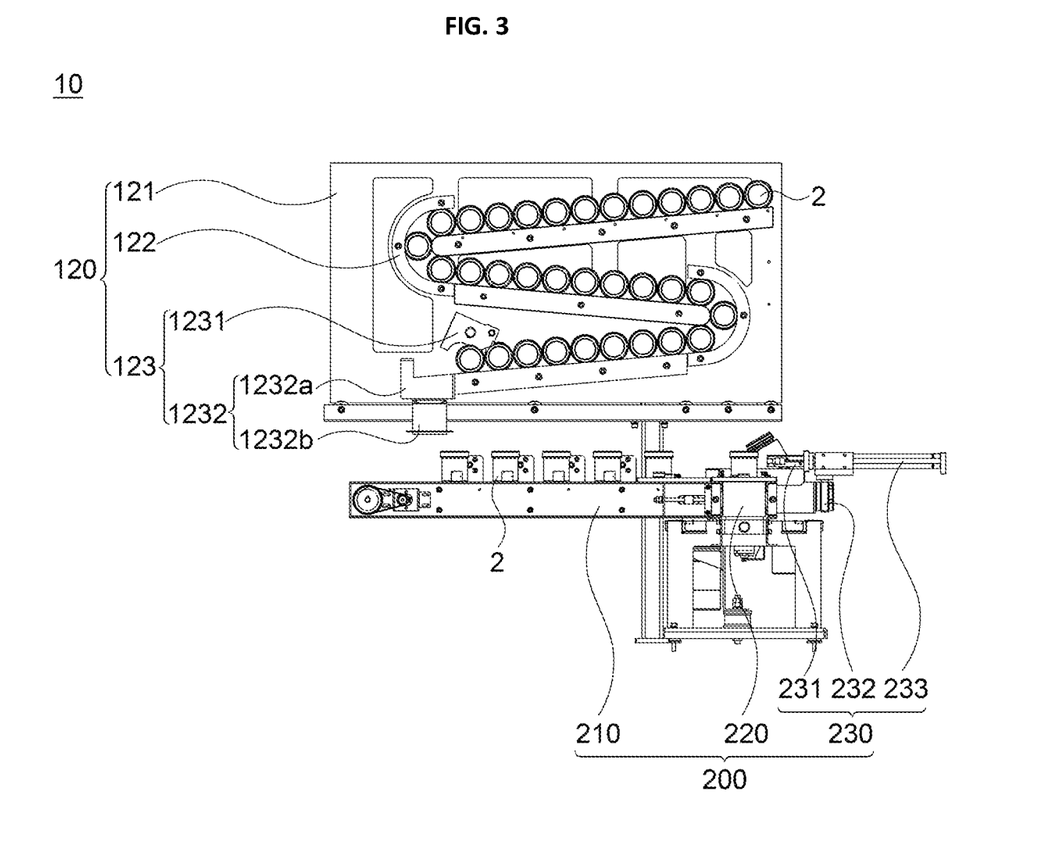
FIG. 3 is a side view of the first-in first-out solder container automatic supply management system according to the embodiment of the present invention.
Figure 4:
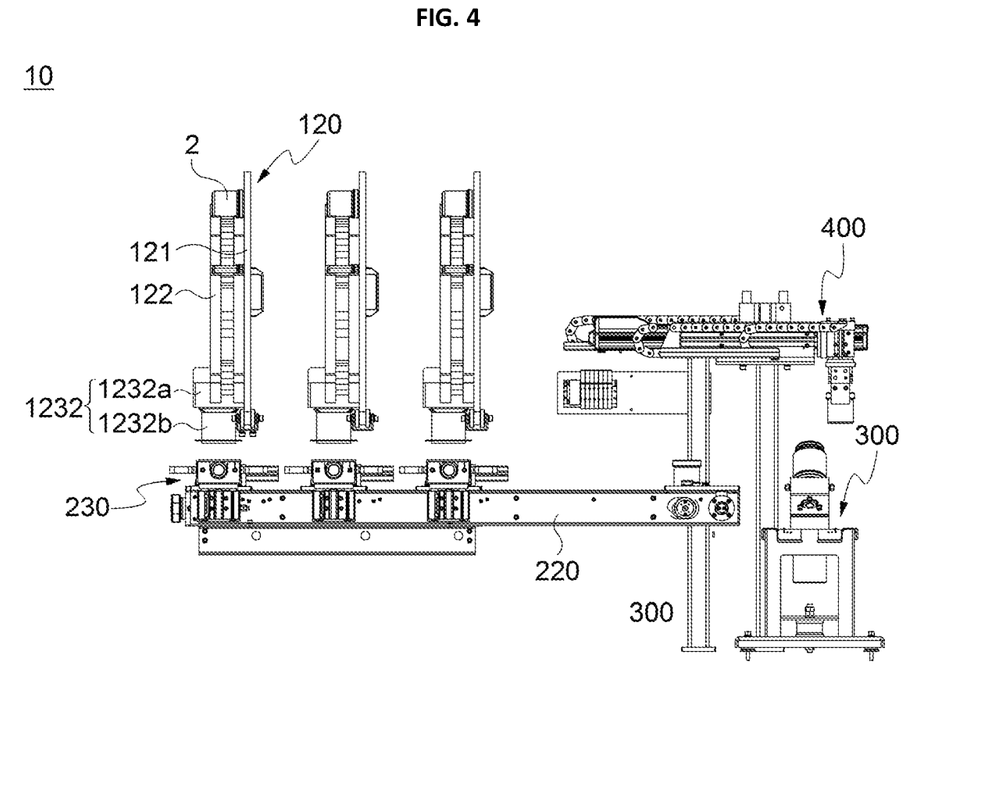
FIG. 4 is a front view of the first-in first-out solder container automatic supply management system according to the embodiment of the present invention.

FIG. 2 is an enlarged view of a part A of FIG. 1, FIG. 3 is a side view of the first-in first-out solder container automatic supply management system 10 according to the embodiment of the present invention, and FIG. 4 is a front view of the first-in first-out solder container automatic supply management system 10 according to the embodiment of the present invention. Meanwhile, in FIG. 2 and the following drawings, the illustration of the refrigerating housing 110 will be omitted for convenience of description.

Referring to FIGS. 2 to 4, each of the plurality of storage wall parts 120 may include a partition 121 having a predetermined thickness for partitioning an inner space of the refrigerating housing 110 and an S-shaped storage rail 122, and the storage rail 122 may be arranged on the partition 121 to be perpendicular to the ground. In this case, the plurality of solder containers 2 may be stacked and stored on the storage rail 122 in an S shape so as to be inclined to the ground. Further, the plurality of solder containers 2 may be formed in a cylindrical shape and stored in a lying form such that a longitudinal direction thereof is parallel to the ground.

Meanwhile, each of the plurality of storage wall parts 120 may further include a solder discharge part 123 for discharging the outermost solder container 2 among the plurality of stored solder containers 2 to the transfer part 200. In this case, the solder discharge part 123 may stand up on the transfer part 200 and discharge the outermost solder container 2.

Specifically, the solder discharge part 123 may include an engaging part 1231 which is formed at a lowermost end (i.e., an end of the solder container 2 in a direction in which the solder container 2 is moved by its own weight) of the storage rail 122 and restricts the movement of the solder container 2. In this case, the engaging part 1231 may be formed in a hook shape and rotated at a predetermined angle with respect to a hinge shaft coupled to the storage rail 122 so as to restrict the movement of the solder container 2 or make the solder container 2 movable by its own weight.

Further, the solder discharge part 123 may further include a standing discharge part 1232 including an inlet part 1232*a* positioned so as to be in contact with the lowermost end of the storage rail 122 and into which the solder container 2 is introduced and a discharge path 1232*b* which extends downward from the inlet part 1232*a* and guides the solder container 2 to stand up.

Specifically, the inlet part 1232*a* may include an inlet (not shown) having a cross-sectional area that is perpendicular to the inlet and becomes smaller in a downward direction, and the inlet may be formed to be inclined with respect to the ground so that the outermost solder container 2 on the storage rail 122 may be introduced at a predetermined inclination. Meanwhile, the discharge path 1232*b* may be formed in a cylindrical shape in which a diameter of an inner circumferential surface is greater than that of an outer circumferential surface of the solder container 2. In this case, the discharge path 1232*b* may extend downward (toward the first conveyor part 210) from a lower end of the inlet part 1232*a*, and a diameter of a lower end of the inlet and the diameter of the inner circumferential surface of the discharge path 1232*b* may be identical to each other.

Further, a longitudinal central axis of the discharge path 1232*b* may be arranged to be axially aligned with a vertical central axis of the plurality of solder containers 2 stored on the storage rail 122. That is, the outermost solder container 2 on the storage rail 122 may be introduced in a state of being biased to one side in a lateral direction of the inlet part 1232*a* and may be introduced into the discharge path 1232*b* in a inclined state through the inlet inclined downward. In this case, the solder container 2 may pass through the cylindrical discharge path 1232b and be discharged to the first conveyor part 210 in a standing state.

Meanwhile, an ideal storage temperature in the refrigerating housing 110 may be maintained in a range of 0° C. to 15° C. and, most preferably, may be maintained in a range of 1° C. to 10° C. When an internal temperature of the refrigerating housing 110 is lower than 0° C., particles of the contents of the solder container 2 may be frozen, and when the internal temperature of the refrigerating housing 110 is higher than 15° C., the contents of the solder container 2 may be oxidized.

Further, the refrigerating housing 110 may include a door 111 constituting one surface of the refrigerating housing 110, and the door 111 may be opened or closed by being rotated at a predetermined angle with respect to a hinge coupling part. In this case, the door 111 may be arranged at a right angle to the plurality of storage wall parts 120, and an inlet 1111 through which the solder container 2 can be introduced into the plurality of storage rail 122 may be formed on a portion of an upper side of the door 111. Specifically, the inlet 1111 may be formed in the same number as the number of the storage wall parts 120 and may be formed at a position (i.e., a starting point at which the solder container 2 is stored in the storage rail 122) adjacent to an uppermost end of the storage rail 122.

Furthermore, each of the plurality of storage wall parts 120 may be slid to the outside of the refrigerating housing 110 in a lateral direction thereof. Specifically, the refrigerating housing 110 may include a plurality of sliding guides 112 on a bottom surface thereof. In this case, each of the plurality of storage wall parts 120 may be positioned on the plurality of sliding guides 112 and slid in the lateral direction thereof. Accordingly, the user may slide each of the plurality of storage wall parts 120 to the outside of the refrigerating housing 110 with the door 111 in an opened state and may place a large number of solder containers 2 on the storage rail 122 or may easily pull out the solder containers 2 placed on the storage rail 122.

Meanwhile, each of the plurality of sliding guides 112 may include a plurality of roller members, but the present invention is only exemplary and is not limited thereto, and it is sufficient that each of the plurality of sliding guides 112 may have a structure capable of moving the storage wall part 120 in the lateral direction.

Furthermore, the first-in first-out solder container automatic supply management system 10 according to the embodiment of the present invention may communicate with a manufacturing execution system (MES) so that it is possible to easily monitoring each process in real time, confirming a work history, and determining a status.

Meanwhile, as described above, the plurality of first conveyor parts 210 may be formed in the same number as the number of the plurality of storage wall parts 120. Further, the plurality of first conveyor parts 210 may be arranged below the refrigerating housing 110 in the lateral direction along the alignment direction of the plurality of storage wall parts 120. In this case, the second conveyor part 220 may also be arranged below the refrigerating housing 110.

Accordingly, a space occupied by the first-in first-out solder container automatic supply management system 10 according to the embodiment of the present invention may be minimized. Further, the solder container 2 inserted through the inlet 1111 positioned at one side of the refrigerating housing 110 may be discharged to the first conveyor part 210 at another side of the refrigerating housing 110, and the discharged solder container 2 may be re-transferred to one side of the refrigerating housing 110 through the first conveyor part 210 and the second conveyor part 220 and then stirred.

Figure 5:
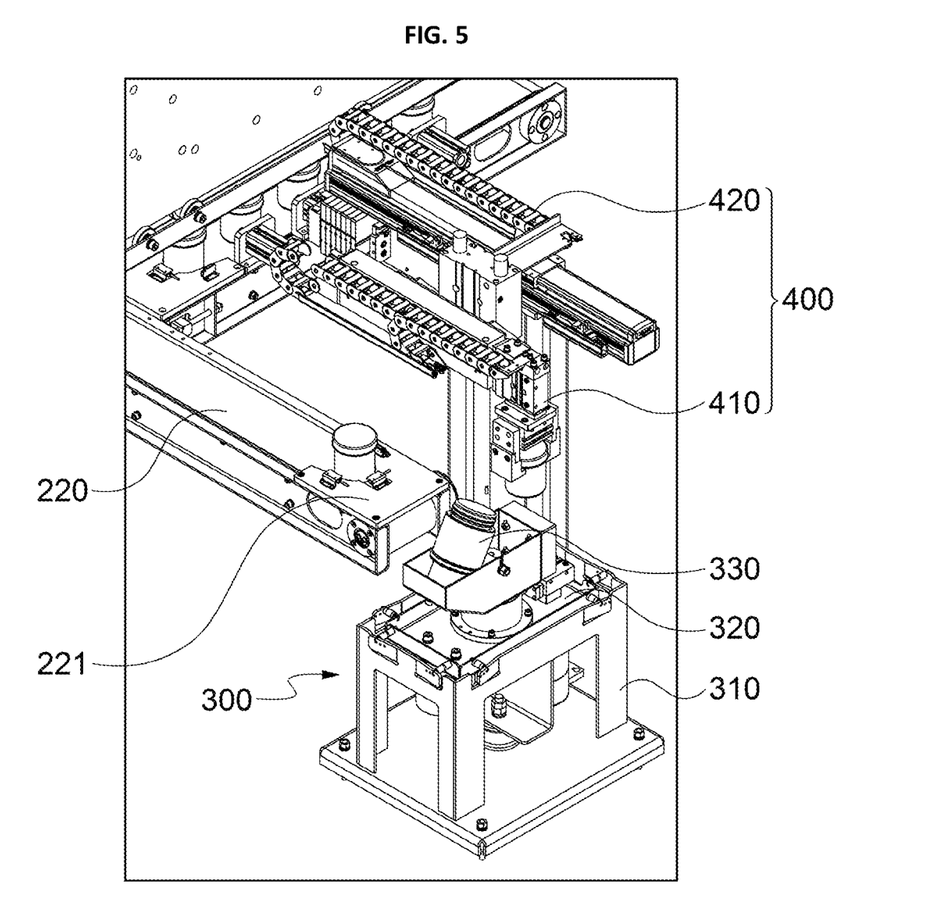
FIG. 5 is an enlarged view of a hand part of the first-in first-out solder container automatic supply management system according to the embodiment of the present invention.
Figure 6:
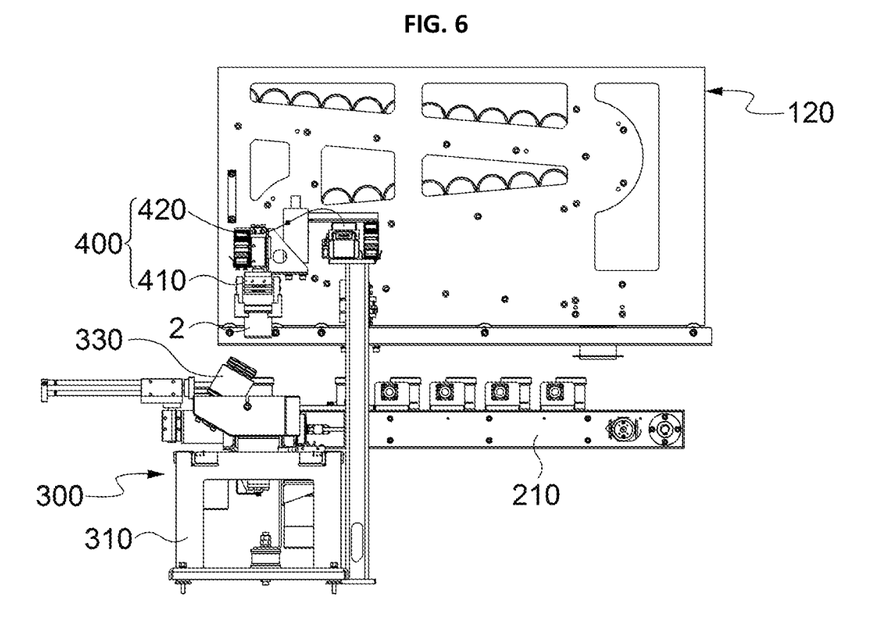
FIG. 6 is another side view of the first-in first-out solder container automatic supply management system according to the embodiment of the present invention.

FIG. 5 is an enlarged view of the hand part 400 of the first-in first-out solder container automatic supply management system 10 according to the embodiment of the present invention, and FIG. 6 is another side view of the first-in first-out solder container automatic supply management system 10 according to the embodiment of the present invention.

Referring to FIGS. 5 and 6, the hand part 400 may include a gripper 410 configured to grip any one of the solder containers 2 on the transfer part 200 and a hand driving part 420 configured to move the gripper 410 to one side in a lateral direction thereof. Further, the gripper 410 may be moved up and down in a direction perpendicular to the ground.

Specifically, the solder container 2 which is transported to the second conveyor part 220 by the gripping part 230 may be transferred to an end of the second conveyor part 220 in the transferring direction by the operation of the second conveyor part 220. In this case, a position fixing part 221 which restricts the movement of the solder container 2 may be formed at an end of the second conveyor part 220 in the transferring direction. A fixing groove may be formed to be curved inward from and recessed in the position fixing part 221, and the solder container 2 may be restricted in its movement by being insertion-supported in the fixing groove. That is, it is possible to prevent the solder container 2 from being released to the outside of the second conveyor part 220 while the solder container 2 is being transferred, and the solder container 2 may be positioned at a preset position at the end of the second conveyor part 220 in the transferring direction.

Further, the gripper 410 may be horizontally moved in the transferring direction of the second conveyor part 220 from above the second conveyor part 220 through the hand driving part 420. In this case, the hand driving part 420 may be formed in a structure in which the gripper 410 is slid along a guide rail, but the present invention is only exemplary and is not limited thereto, and it is sufficient that the hand driving part 420 has a structure in which the gripper 410 is horizontally moved in one direction by the operation of a driving motor.

Meanwhile, the gripper 410 may be positioned at the same lateral position as the second conveyor part 220 with respect to the ground. More specifically, the horizontal movement direction of the gripper 410 and the transferring direction of the second conveyor part 220 may be parallel to each other in any plane perpendicular to the ground.

Further, the gripper 410 may be formed to be moveable up and down with respect to the ground. Furthermore, the gripper 410 may be rotated by a predetermined angle in an inclined direction with respect to the direction perpendicular to the ground. Accordingly, the gripper 410 may easily grip the solder container 2 on the second conveyor part 220 and easily mount the solder container 2 on a mounting part 330 of the stirring part 300 to be described below. Meanwhile, the upward and downward driving and the predetermined angle rotational driving of the gripper 410 may be performed through two driving motors or cylinders, but the present invention is only exemplary and is not limited thereto.

Figure 7:
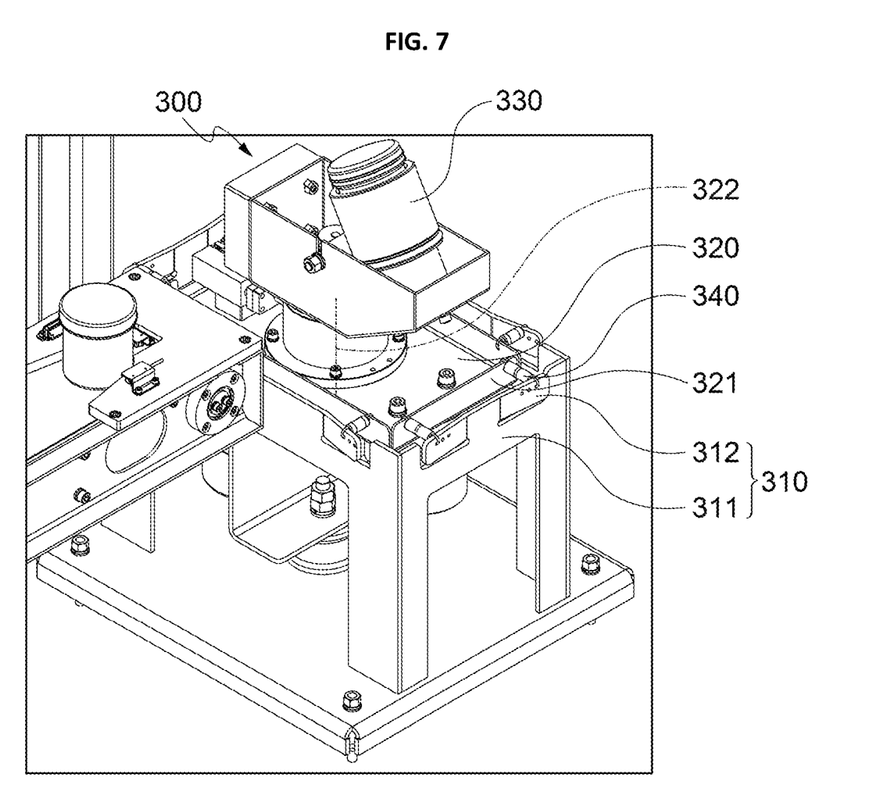
FIG. 7 is an enlarged view of a stirring part of the first-in first-out solder container automatic supply management system according to the embodiment of the present invention.

FIG. 7 is an enlarged view of the stirring part 300 of the first-in first-out solder container automatic supply management system 10 according to the embodiment of the present invention.

Referring to FIG. 7, the stirring part 300 may include a support frame 310 positioned at a side portion of the end of the second conveyor part 220 in the transferring direction, a stirring plate 320 connected to the support frame 310 through a plurality of elastic support parts 340, and a mounting part 330 which is positioned on the stirring plate 320 and on which the solder container 2 is mounted. In this case, the mounting part 330 may be formed in a hollow cylinder shape and a longitudinal central axis thereof may be positioned to be inclined with respect to the ground.

Meanwhile, the stirring plate 320 may be positioned parallel to the ground, and a sidewall part 321 positioned to be perpendicular to the ground may be formed along an edge in a lateral direction thereof. In this case, the support frame 310 may be positioned to surround the sidewall part 321 of the stirring plate 320, and the sidewall part 321 and the support frame 310 may be connected to each other through the plurality of elastic support parts 340.

Further, the stirring plate 320 may be reciprocally rotated about a rotation central axis 322. In this case, since the stirring plate 320 is connected to the support frame 310 through the plurality of elastic support parts 340, a rotation range of the stirring plate 320 may be limited to a predetermined angle. Further, since the stirring plate 320 is rotated, the mounting part 330 positioned on the stirring plate 320 may also be rotated in the lateral direction and the solder container 2 positioned on the mounting part 330 may be horizontally stirred.

More specifically, the support frame 310 may include a support part 311 having a fixed position and a plurality of bent parts 312 which are formed by bending a portion of the support part 311 at a predetermined angle and to which the elastic support parts 340 are connected. That is, the sidewall part 321 may be connected to the plurality of bent parts 312 through the plurality of elastic support parts 340. In this case, each of the plurality of bent parts 312 may be formed to be elastically bent at a predetermined angle toward the sidewall part 321 as the stirring plate 320 is rotated in one direction. Further, each of the plurality of bent parts 312 may be elastically bent toward the outside of the sidewall part 321 as the stirring plate 320 is rotated in an opposite direction (another direction).

Meanwhile, preferably, the sidewall part 321 may be formed with four surfaces. Eight bent parts 312 may be formed and two bent parts 312 may be connected to one sidewall part 321. In this case, eight elastic support parts 340 may be formed to elastically connect each of the eight bent parts 312 to the stirring plate 320. As described above, in addition to the elastic support part 340, the elastic rotation of the bent part 312 is added so that the rotation range of the stirring plate 320 may be increased and stirring efficiency of the solder container 2 may be increased.

Meanwhile, the longitudinal central axis of the solder container 2 positioned on the mounting part 330 may be positioned to be inclined with respect to the ground, and thus the contents in the solder container 2 may be stirred in up and down and left and right directions when the stirring plate 320 is rotated.

Further, the mounting part 330 may be positioned to be eccentric with respect to the rotation central axis 322. More specifically, a center of the rotation of the mounting part 330 may be positioned at the outside in the lateral direction with respect to the rotation central axis 322, and the center of the rotation of the mounting part 330 may be repeatedly rotated with an arc of a predetermined angle as the stirring plate 320 is repeatedly rotated. Accordingly, even when the stirring plate 320 is rotated at a slightly small angle, an entirety of the mounting part 330 may be rotated at a predetermined angle and the stirring efficiency of the solder container 2 may be increased.

According to the embodiments of the present invention, a large number of solder containers are stored in a refrigerating chamber, and thus oxidation of contents of the solder containers can be prevented.

Further, according to the embodiments of the present invention, solder containers discharged from a refrigerating chamber can be stored at room temperature for a preset time and then automatically stirred.

Further, according to the embodiments of the present invention, a plurality of solder containers are classified by each manufacturer or type and stored in a refrigerated state and at room temperature, and thus only a solder container of a specific manufacturer or type can be selected and supplied according to a user's need.

Further, according to the embodiments of the present invention, processes of discharging solder containers from a refrigerating chamber, storing solder containers at room temperature, and inputting solder containers to a stirrer are automated in a first-in first-out manner and a first-in first-out solder container automatic supply management system communicates with an MES, and thus safety and convenience of an operator can be increased.

While the present invention have been described above in detail with reference to the representative embodiments, it should be understood by those skilled in the art that the embodiments may be variously modified without departing from the scope of the present invention. Therefore, the scope of the present invention is defined not by the described embodiment but by the appended claims, and encompasses equivalents that fall within the scope of the appended claims.

What is claimed is:

1. A solder container automatic supply management system, comprising:
   a refrigerating chamber configured to store a plurality of solder containers;
   a transfer part positioned outside the refrigerating chamber and configured to move at least one of the plurality of solder containers;
   a stirring part formed at one end of the transfer part and configured to stir the at least one solder container; and
   a gripping and moving part configured to grip and move any one solder container of the at least one solder container positioned on the transfer part to the stirring part,
   wherein the refrigerating chamber includes a refrigerating housing and a plurality of storage wall parts positioned in the refrigerating housing and each configured to store the plurality of solder containers; and the plurality of solder containers are stored and arranged on each of the plurality of storage wall parts in a line to be inclined to a ground; and
   each of the plurality of storage wall parts includes a solder discharge part configured to discharge an outermost solder container among the plurality of stored solder containers to the transfer part; and the solder discharge part stands up on the transfer part and discharges the outermost solder container.

2. The solder container automatic supply management system of claim 1, wherein the transfer part includes:
   a plurality of first conveyor parts arranged at the same arrangement interval as that of the plurality of storage wall parts and configured to transfer the solder container discharged from the refrigerating chamber; and a second conveyor part arranged in a direction perpendicular to a transferring direction of the first conveyor part and configured to transfer the solder container to the stirring part.

3. The solder container automatic supply management system of claim 2, wherein the transfer part further includes a plurality of gripping parts for transporting the solder container positioned on the plurality of first conveyor parts to the second conveyor part side;

each of the plurality of gripping parts transports the solder containers, which are discharged from the refrigerating chamber, on the plurality of first conveyor parts after a preset time has elapsed; and any one of the plurality of gripping parts transports only the solder container which is positioned on the first conveyor part at a predetermined position among the plurality of first conveyor parts to the second conveyor part.

4. The solder container automatic supply management system of claim 2, wherein the number of the plurality of first conveyor parts is the same as the number of the plurality of storage wall parts; and the plurality of first conveyor parts are arranged below the plurality of storage wall parts in a lateral direction thereof.

5. The solder container automatic supply management system of claim 1, wherein the gripping and moving part includes:

a gripper configured to grip any one of the solder containers on the transfer part, the gripper being movable upward and downward in a direction perpendicular to a ground; and a hand driving part configured to move the gripper to one side in a lateral direction thereof.

6. The solder container automatic supply management system of claim 1, wherein the stirring part includes:

a support frame;

a stirring plate connected to the support frame through a plurality of elastic support parts; and a mounting part which is positioned on the stirring plate and on which the solder container is mounted.

7. The solder container automatic supply management system of claim 6, wherein the mounting part is formed in a hollow cylinder shape and a longitudinal central axis thereof is positioned to be inclined with respect to a ground.

8. The solder container automatic supply management system of claim 6, wherein the support frame is positioned to surround an outer side surface of the stirring plate in a lateral direction thereof;

the support frame is connected to a side portion of the stirring plate in the lateral direction through the plurality of elastic support parts; and the stirring plate is rotatable about a rotation central axis.

* * * * *